(No Model.)

G. SWEET.
HARROW TOOTH ATTACHMENT.

No. 361,792.

Patented Apr. 26, 1887.

WITNESSES
E. A. Newman,
C. M. Newman.

INVENTOR
George Sweet,
By his Attorneys

UNITED STATES PATENT OFFICE.

GEORGE SWEET, OF DANSVILLE, NEW YORK.

HARROW-TOOTH ATTACHMENT.

SPECIFICATION forming part of Letters Patent No. 361,792, dated April 26, 1887.

Application filed February 25, 1887. Serial No. 228,855. (No model.)

*To all whom it may concern:*

Be it known that I, GEORGE SWEET, of Dansville, in the county of Livingston and State of New York, have invented certain new and useful Improvements in Harrow-Tooth Attachments, of which the following is a specification.

My invention relates to improvements in that class of devices employed for attaching curved-spring harrow-teeth to their carrying-bars in such manner as to provide for adjusting the teeth by vibrating them to raise or lower their points; and my object is to provide a cheap, durable, and simple device of this kind.

Figure 1:
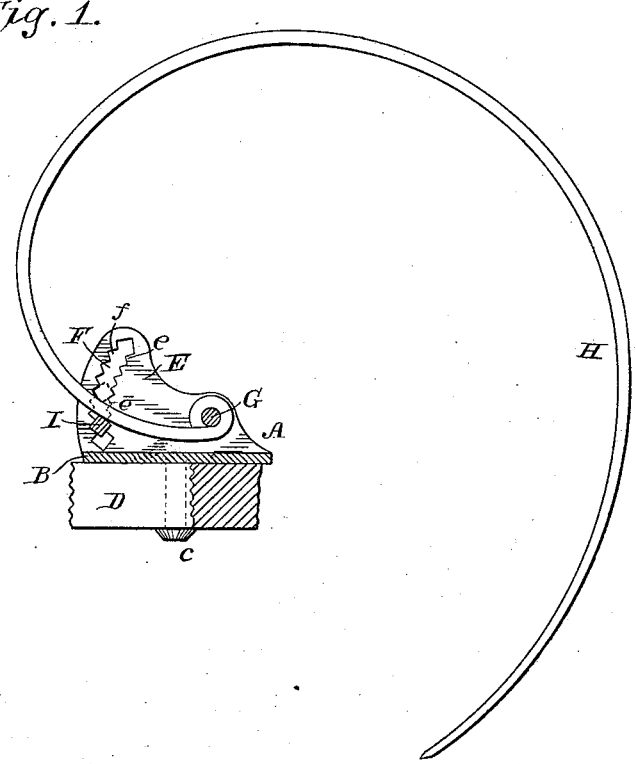
Figure 2:
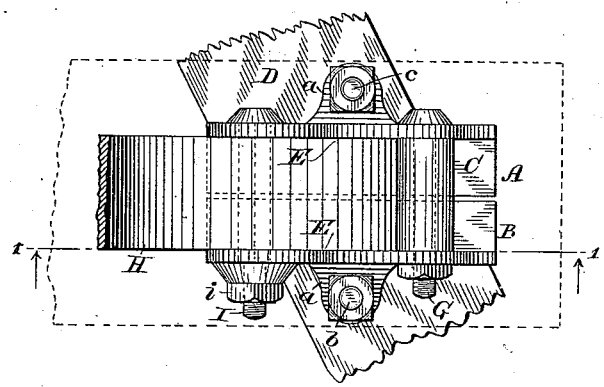

In the accompanying drawings, Figure 1 is a view partly in side elevation and partly in section, and Fig. 2 is a plan view of my improvements. In Fig. 2 a rear end of a drag-bar is indicated by dotted lines, thus showing how my improvements may be applied either to a carrying-bar common to a number of teeth or when each tooth has its individual carrying-bar or drag-bar.

A bracket, A, (shown as centrally divided or formed in two similar sections, B C,) is secured by bolts *b c* to the carrying-bar D, these bolts passing through ears or side lugs, *a a*, of the respective sections of the bracket. The bracket has upwardly-extending sides E E, of corresponding form, these sides being highest at the front end of the bracket, where they are provided with curved slots F, the slots in the respective sides being diametrically opposite each other and of similar formation. Each slot is provided with angular notches or V-shaped recesses *e f* in its opposite walls. Near the rear end of the bracket its sides are perforated to receive a tooth-pivoting bolt, G.

The upper end of the curved spring-tooth H is bent to form an eye through which the bolt G passes, thus pivotally securing the tooth at its upper end to the bracket. A square clamping-bolt, I, passes through the slots F and engages with the angular notches formed therein, so that this bolt will be positively supported beneath the tooth near its upper end, thus preventing ascent of the tooth at its point. When the nut *i* on the bolt I is tightened, the sides of the bracket at its front end are drawn toward each other, thus producing sufficient pressure against the edges of the tooth to prevent accidental descent of its point.

It will be seen that the tooth, while strongly supported, may readily be adjusted to suit the depth at which it is desired to work, and that, as the shape of the bracket is such that it may be readily cast, an economical device is provided.

I do not wish to be understood as confining my invention strictly to the precise details of construction above set forth, as some modifications may be made without departure therefrom. For instance, a round bolt may be substituted for the square bolt I and the notches *e f* be curved to seat the round bolt, instead of angular, as shown; and instead of clamping the tooth between the sides of the bracket to prevent its movement in one direction a second bolt I may be used above the tooth, (see dotted lines, Fig. 1,) or a mere pin might be used instead of the second bolt.

I claim as my invention—

1. The combination of the carrying-bar, the bracket secured thereto and having at one end the corresponding slots in its opposite sides, the curved tooth pivotally supported at the opposite end of the bracket, between the sides thereof, and the clamping-bolt passing through the bracket-slots and serving by contact with the tooth to prevent the ascent of its point, substantially as and for the purpose set forth.

2. The combination of the carrying-bar, the bracket provided with the upwardly-extending sides having corresponding curved slots with notches in their walls, the curved tooth provided with the pivoting eye, the bolt passing through said eye and through the sides of the bracket, and the clamping-bolt engaging the bracket-slots, substantially as and for the purpose set forth.

3. The combination of the centrally-divided bracket having the side ears and the curved slots in its upwardly-projecting sides at front, the carrying-bar, to which the bracket is secured by bolts passing through said ears, the clamping-bolt, the curved tooth provided with the eye at its upper end, and the tooth-pivoting bolt supported in the bracket sides at its rear end, substantially as and for the purpose set forth.

In testimony whereof I have hereunto subscribed my name.

GEORGE SWEET.

Witnesses:
J. C. WHITEHEAD,
F. T. BRETTLE.